(12) United States Patent
Jennings

(10) Patent No.: US 6,867,520 B2
(45) Date of Patent: Mar. 15, 2005

(54) ELECTRO-MECHANICAL BATTERY

(76) Inventor: Bruce A. Jennings, 2490 S. Frankwood, Sanger, CA (US) 93657

(*) Notice: Subject to any disclaimer, the term of this patent is extended or adjusted under 35 U.S.C. 154(b) by 159 days.

(21) Appl. No.: 09/848,789

(22) Filed: May 4, 2001

(65) Prior Publication Data

US 2001/0036565 A1 Nov. 1, 2001

Related U.S. Application Data

(60) Provisional application No. 60/202,127, filed on May 5, 2000.

(51) Int. Cl.[7] .............................. H02K 7/09; F16C 32/09
(52) U.S. Cl. ........................... 310/90.5; 74/574; 310/74
(58) Field of Search ............................... 310/90.5, 113, 310/74, 153; 74/572, 574, 5.46

(56) References Cited

U.S. PATENT DOCUMENTS

| 3,572,854 A | * | 3/1971 | Danby | 308/10 |
| 4,870,310 A | * | 9/1989 | Triplett | 310/74 |
| 5,695,584 A | * | 12/1997 | Gregoire | 156/169 |
| 6,111,332 A | * | 8/2000 | Post | 310/90.5 |
| 2001/0036565 A1 | * | 11/2001 | Jennings | 429/10 |

FOREIGN PATENT DOCUMENTS

| JP | 56-63117 | * | 5/1981 | F16C/32/04 |
| JP | 59-37323 | * | 2/1984 | F16C/32/04 |
| JP | 62-095952 | * | 5/1987 | H02K/21/14 |

OTHER PUBLICATIONS

Translation of jp 62–95952, "Generator", Yokono, May 1987.*

* cited by examiner

*Primary Examiner*—Karl Tamai
(74) *Attorney, Agent, or Firm*—Richard A. Ryan

(57) ABSTRACT

An electromechanical battery having an annular rotor structure with magnetic levitation components integrally mounted in the rotor structure providing a passive levitation system in conjunction with a central core having permanent magnet elements mounted thereon, eliminating the need for the shaft and hub typically used on such devices. The rotor structure and central core are disposed in an evacuated housing. The rotor comprises a composite core wrapped with one or more layers of high-strength composite filaments, wherein the first layer is wrapped over the composite core in a continuous filament spiral-wound pattern, the second layer is wound in the same pattern, but in a counter-rotating direction and the third layer is wound in sequential planes radial to the axis of the rotor. Preferably, the closed-circuit conductive coils are embedded in the rotor structure and the magnet elements are configured in a Halbach Array.

50 Claims, 8 Drawing Sheets

ELECTRO-MECHANICAL BATTERY

CROSS-REFERENCE TO RELATED APPLICATIONS

This application claims the benefit of U.S. Provisional Application No. 60/202,127 filed May 5, 2000.

BACKGROUND OF THE INVENTION

1. Field of the Invention

The present invention relates to kinetic energy storage devices. More specifically, the invention is directed to such devices capable of translating electrical energy into the momentum of a rotating, magnetically suspended rotor element for storage during an indefinite period of time and translating this stored kinetic energy back into an electrical form with minimal losses.

2. Background

Devices for storing energy have been known for some time. The most common type of energy storage device is the lead-acid battery. Lead-acid batteries are known to have a limited amount of storage capacity, wear out after a relatively short period of time, contain numerous toxic metals and chemicals, fail without warning and are sensitive to high and low temperatures. Despite these problems, lead-acid batteries are the primary devices utilized to store energy for all types of uses, including automobiles and many everyday apparatuses. Lead-acid batteries, typically combined together in large arrays, also provide back-up power to those installations that need an uninterruptable supply of energy, including large computer installations, phone companies and many others. Electrically powered automobiles, which many are hoping will reduce pollution caused by internal combustion engine automobiles, require batteries to store energy for operation. To-date, however, the batteries available for automobiles are too costly, take too long to recharge, do not provide enough range, take up too much room and weigh too much.

Even the sophisticated batteries used in the space program, such as in satellites and space stations, have significant limitations due to the fact that the solar panels on the satellite or space station can only generate electricity for operation when the solar panels are located in the direct sunlight. When the satellite or space station passes through the Earth's shadow, it must rely on the energy stored in onboard batteries for its operation. As a result, these batteries are subject to frequent charge/discharge cycles that tend to wear out the batteries after a relatively short period of time. For satellites, the life span of these batteries can be the limiting factor for the life of the satellite itself. Due to the limitations and problems with presently available batteries, many people are looking into developing new technologies for energy storage. One such technology pertains to the use of flywheels.

For centuries, the venerable potter's wheel has demonstrated the capacity of a flywheel to effectively store energy in a kinetic form as a function of numerous variables, including rotor mass, diameter, and maximum rate of rotation, to name a few. The basic concept for modern flywheel energy storage devices is that electricity is fed into the battery to power a motor which accelerates the flywheel to high rotating speed by riding on magnetic bearings inside a vacuum container. The lack of resistance in the container (or housing) allows the flywheel to spin nearly indefinitely after the power input is cutoff. When needed, electricity is drawn out of the battery, with the motor functioning as a generator, causing the flywheel to slow down. Flywheel energy storage devices are not affected by the discharge/charge cycle problem of other batteries and do not have their high and low temperature limitations. In addition, it is generally known that flywheel devices can accept much higher levels of energy storage per pound and are not likely to have the limited life of presently available batteries.

Energy storage capacity in a flywheel device is typically increased by one of two ways, either with additional rotor mass or higher rates of speed. The mass affects energy storage on a one-to-one relationship, whereas speed has squaring effect on the energy storage. Materials available in the past, such as stone and metals, have been better suited to increases in rotor mass rather than speed. However, while a five-fold increase in rotor mass yields an equal five-fold increase in energy storage, a five-fold increase in rotor speed produces twenty-five times the energy storage capacity. As a result, many current flywheel development efforts focus on materials and designs which allow improvements in peak rotor velocity and attempt to counter the enormous centrifugal forces exerted on the rotor structure at extreme speeds. Since these radial forces also increase as the square of rotational speed, the properties of low density and high specific strength have made composite fibers (glass or carbon) bonded in a polymer matrix the materials of choice in high-speed flywheel projects during the past two decades.

Running on magnetic bearings, composite energy storage flywheels are expected to attain speeds in excess of 100,000 rpm and rim speeds of several thousand miles per hour. At such elevated speeds, energy densities up to ten times that of typical chemical battery systems can theoretically be achieved. Energy through-put efficiencies of 90–95% are expected, surpassing the 60–70% range that is typical of chemical batteries. As a result of their high energy densities and efficiencies, these super-speed energy storage flywheels are ideally suited to space applications, giving rise to the term "aerospace flywheel" for such devices. Space applications further benefit from the ability of these flywheels to serve a dual purpose, as integrated power and attitude control systems ("IPACS"), thereby not only replacing chemical batteries for energy storage, but also serving the role of the low-speed flywheels now used for gyroscopic orientation for many satellites.

At present, several technical challenges continue to plague aerospace flywheel development, challenges which have limited the world speed record for flywheel speed in a complete battery system to approximately 60,000 rpm. With some variation, the typical contemporary aerospace flywheel battery, shown in FIG. 1 (which is a NASA drawing) as 10, comprises a hoop-wound, composite filament rim 12 bound in a polymer matrix attached to a steel axle or shaft 14 via a metallic or composite hub structure 16. The steel shaft 14 is suspended, using magnetic bearing elements 18 (radial magnetic bearings) and 20 (axial magnetic bearing) inside a containment structure or housing 22 that is evacuated to minimize aerodynamic friction. A motor/generator 24 having high bi-directional efficiency and auxiliary bearings 26 are also utilized. The composite rim 12 is typically made of circumferentially wound carbon or glass fibers in a polymer matrix material, such as epoxy, to bind the fibers together. Although rim 12 designs of circumferentially wound composite fibers have excellent hoop strength, they have a very limited ability to withstand the enormous radial forces experienced during high-speed operation. The tendency of these rims 16 is to develop cracks between adjoining fibers from failure of the epoxy binder. Once these cracks occur, they elongate rapidly during charge/discharge cycling, eventually resulting in complete rim destruction.

Another limiting factor of the present flywheel designs is the cost, complexity, and limitations of the active bearing systems 18 and 20 employed in all current designs. Because of extreme frictional losses, simple mechanical bearings have been replaced with units consisting of a myriad of electronic and electrical devices designed to suspend the rotor mass, as well as damp out dynamic loads. A series of sensors monitor precise shaft 14 location numerous times per revolution, feed this data to a computer for evaluation, which in turn activates electromagnets 18 and 20 located along the rotor shaft 14 to correct fluctuations. Overall energy storage efficiency is reduced due to power requirements of the bearing systems. As with all mission-critical, failure-prone systems, redundancies are required, imposing a greater weight and cost burden on the flywheel unit 10. By their nature, computer controlled bearing systems are costly. In addition, extricating usable data from sensors and data processors, and applying that information to the electromagnetic bearings 18 and 20 in a timely manner at these speeds (and higher) is now recognized as a major, if not insurmountable hurdle, to overcome.

Prior art rotor structure (comprising the rim 12, shaft 14 and hub 16), as much as material selection, is crucial to performance at extreme speeds. As the interface between the magnetic bearings 18 and 20 and the rim 12 of a flywheel rotor, the shaft 14 and hub 16 unit must accommodate the transfer of extreme dynamic loads from the rotor's high-velocity rim 12 to the flywheel's housing 22 and support structure (not shown) via the magnetic bearings 18 and 20. In mobile applications, dynamic loads introduced from external sources must also be transferred back through the shaft 14 and hub 16 unit to the gyroscopically stabilized rim 12. While these forces vary from high-frequency oscillations to relatively long duration torsional loads, the cumulative effect will fatigue the shaft 14 and hub 16 materials, effectively reducing the lifespan of the rotor unit 10. The relatively close clearances required by modern magnetic bearings 18 and 20 tends to limit resilience in this location, leading some to favor a flexible hub 16 design in an attempt to isolate the rim-induced dynamic forces from the shaft 14 and hub 16. This added elasticity, however, can exacerbate the oscillations generated in the rim 12 at certain frequencies of rotation, increasing the likelihood of damage to the rim 12 itself.

With few exceptions, the rim structure of aerospace flywheels consists of continuous filaments of high-strength, light weight materials such as carbon fiber hoop-wound around a spool (i.e., the flywheel hub) and bonded together in a polymer matrix. Carbon fibers are reported to be four times stronger than the best steel, thereby allowing sixteen times more energy storage per pound than a similarly situated steel flywheel. The strength of these composite materials is extremely high inplane to the fibers, but is greatly reduced across the laminate thickness in a unidirectional matrix, as this strength is derived principally from the strength of the polymer binder, as well as the growth characteristics of the filament material under load. As a result, simple filament-wound flywheel rims have exceptional hoop strength, while their strength in the radial direction is severely limited. As speeds increase during the charge cycle, the hoop-wound filaments of a flywheel rim stretch to varying degrees, as a function of their distance from the axis of rotation. As discharge occurs and the rotor slows down, the filaments return to their unloaded state, contracting in length to their original dimensions. After repeated cycles, polymer binder fatigue can propagate microfracturing in the laminate structure, in turn leading to larger cracks and the eventual failure of the rotor rim. In order to maintain safety margins and ensure prolonged life of the flywheel unit, rotor speeds are presently limited by this factor. While some efforts have focused on alternative rim designs, either adding filaments in a radial direction or through other construction processes, few have achieved the benefit of higher speeds and efficiencies intended.

To date, every flywheel running on magnetic bearings has utilized a minimum of one, and often several, active magnetic bearings to achieve stable levitation. Such bearings are deemed "active" due to the electronically controlled servos, feedback sensors, and data processing equipment necessary to maintain the desired shaft position relative to the bearing elements. While non-controlled "passive" bearing elements have been successfully integrated into some high-speed flywheels, at least one axis of motion has always been controlled with an "active" element in each design.

While active bearing systems have matured and improved over time, numerous features make them ill suited for use in aerospace flywheel batteries. Constant parasitic power losses associated with the various electrical components of an active magnetic bearing tend to reduce the overall efficiency of the battery. Utilizing attractive magnetic forces and requiring relatively tight tolerances between the static and rotating portions of the bearing assembly, active bearings tend to be inherently unstable and sensitive to dynamic fluctuations. The position sensors and data processing equipment required by active magnetic bearings dramatically increase their overall cost compared to passive units of equal capacity. These additional components also make active bearings more prone to failure, often necessitating the further complexity and cost of high-speed, back-up mechanical bearings. In order to prevent rotor destruction in the event of even momentary magnetic bearing failures, these back-up bearings require precision components, resilience, and extraordinarily fast response times, adding even further to the cost and complexity of the prior art electromechanical battery unit.

As flywheel speeds have risen, their active bearings have been called upon to process data and carry out shaft-position corrections at ever increasing rates. With current shaft speeds exceeding 1000 revolutions per second, limitations imposed by bandwidth bottlenecks and servo response times are already common problems. What is needed, therefore, is an electromechanical battery that does not require active bearing elements, that has a composite rim which is capable of the higher speeds and able to withstand the resulting higher forces, and a passive magnetic bearing element to facilitate the high speeds necessary to obtain the capacity and efficiencies desired.

SUMMARY OF THE INVENTION

The annular electromechanical battery of the present invention solves the problems and provides the benefits identified above. That is to say, the present invention consists of an annular rotor structure, replacing standard shaft and hub structures with magnetic levitation components integrally mounted within a structurally reinforced composite rim. The present invention utilizes a 100% passive levitation system, comprised of inductive circuits integrally mounted within the inner portion of the rotor assembly and high-strength permanent magnet elements mounted into a composite or aluminum core structure physically attached to the battery housing. The rotor elements consist of closed circuit coils tightly packed around a composite ring, with the completed unit forming the inner portion of the rotor structure. The coils are composed of electrically conductive materials, preferably exhibiting the properties of low density and relative high tensile strength. Aluminum alloys and aluminum clad titanium are possible materials suited to this application.

Traditional flywheels utilizing mechanical bearings require a shaft as an interface to couple the rotor to the bearing elements. With the advent of magnetic bearing systems, resulting in the elimination of physical contact between these structures, the shaft became superfluous to the construction of a flywheel battery. The present invention integrates the rim structure and magnetic bearing elements, to the exclusion of a shaft assembly and its inherent structural weaknesses. With this configuration, dynamic loads are transmitted directly from the rim structure into the housing via the stationary core bearing elements. These loads are more evenly distributed throughout the housing, simplifying structural reinforcement of the unit. With a large footprint and relatively wide clearances afforded with the bearing system, vibrations can be efficiently isolated directly between the rotor and housing. Overall rotor and battery mass is reduced with the elimination of the high-density steel shaft. By eliminating the typical rotating shaft and hub, the present invention places the majority of rotating mass near the rotor perimeter, thereby affording greater inertial efficiency and lower overall device weight. In fact, approximately two-thirds of the total rotor mass is located along the outer 25% of the rotor.

The main body, or second composite core of the rotor of the present invention consists of high-strength composite filaments, principally applied in hoop-wound fashion outboard of the levitation unit. In order to enhance radial strength and rigidity, and reduce hoop delamination to a minimum, several additional layers of composite filaments are overlaid onto the surface of the rotor structure. With the core rotor structure configured with an outside diameter ("OD") to inside diameter ("ID") ratio of two to one, and featuring a teardrop cross-section, the overlay filaments are toroidal in nature. The first and second outer filament layers wind through the ID of the rotor, and over the OD, crossing the OD at approximately 120 degree intervals, to form a generally equilateral triangle weave, as viewed in plan view with a vertical axis. The continuous filament spiral-wound pattern for these two layers are applied in counter-rotating directions (relative to each other). This filament "sling" carries the mass of the hoop-wound filaments, the teardrop cross-section forming a dynamically natural shape to reduce uneven stress under the severe radial loads generated at high speeds. A final outer layer of filaments is wound over these layers in a toroid shape, but approximately perpendicular to the axis of rotation. This layer addresses the issue of varying rates of fiber elongation with respect to their relative distance from the axis, thereby reducing the tendency of delamination between concentric layers of hoop-wound filaments by transferring a portion of the radial loads from the outer rim area to the inner area.

The magnetic levitation system is dynamically induced and passive in nature, resilient and self-stabilizing, through application of a simple three-dimensional confinement field using relatively inexpensive components. The stationary component of the magnetic levitation system of the present invention consists of rare earth magnets mounted within a non-magnetic structure. These magnets are arranged into three rings, the upper and lower rings located above and below the rotor-mounted coil elements, respectively, provide axial control and the middle ring located along the inner perimeter of the rotor coils provides radial control. The magnets are arranged as a plurality of elements within each ring, the polarity of each adjacent element reversed to those on either side along the ring with like poles facing one another. The three rings are oriented with respect to each other so that all like poles fall at the same point radially from the axis point, allowing the magnetic fields of the three rings to reinforce one another along the circular path occupied by the rotor coils. Preferably, these magnets are arranged in a Halbach Array. Electromagnetic elements contained within the core structure react against the induced magnetic fields of the coils during rotation in order to translate electrical energy input into kinetic energy, and back again.

Accordingly, the primary objective of the present invention is to provide an electromechanical battery that utilizes the spinning effect of a composite flywheel to store energy for later re-use.

It is also an important objective of the present invention to provide an electromechanical battery devoid of the typical rotating shaft and hub to reduce the overall weight, shift mass to the outer perimeter and improve operating characteristics and efficiency.

It is also an important objective of the present invention to provide an electromechanical battery that utilizes a spinning composite rotor having one or more layers of composite filaments wrapped around the composite rotor in a continuous filament spiral-wound pattern.

It is also an important objective of the present invention to provide an electromechanical battery that utilizes a spinning composite rotor that includes embedded conductive coils that interact with one or more sets of permanent magnet arrays.

It is also an objective of the present invention to provide an electromechanical battery that utilizes a magnetic levitation system that is dynamically induced and passive in nature to create a three-dimensional confinement field for an externally spinning rotor.

The above and other objectives of the present invention will be explained in greater detail by reference to the attached figures and the description of the preferred embodiment which follows. As set forth herein, the present invention resides in the novel features of form, construction, mode of operation and combination of elements presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Figure 1:
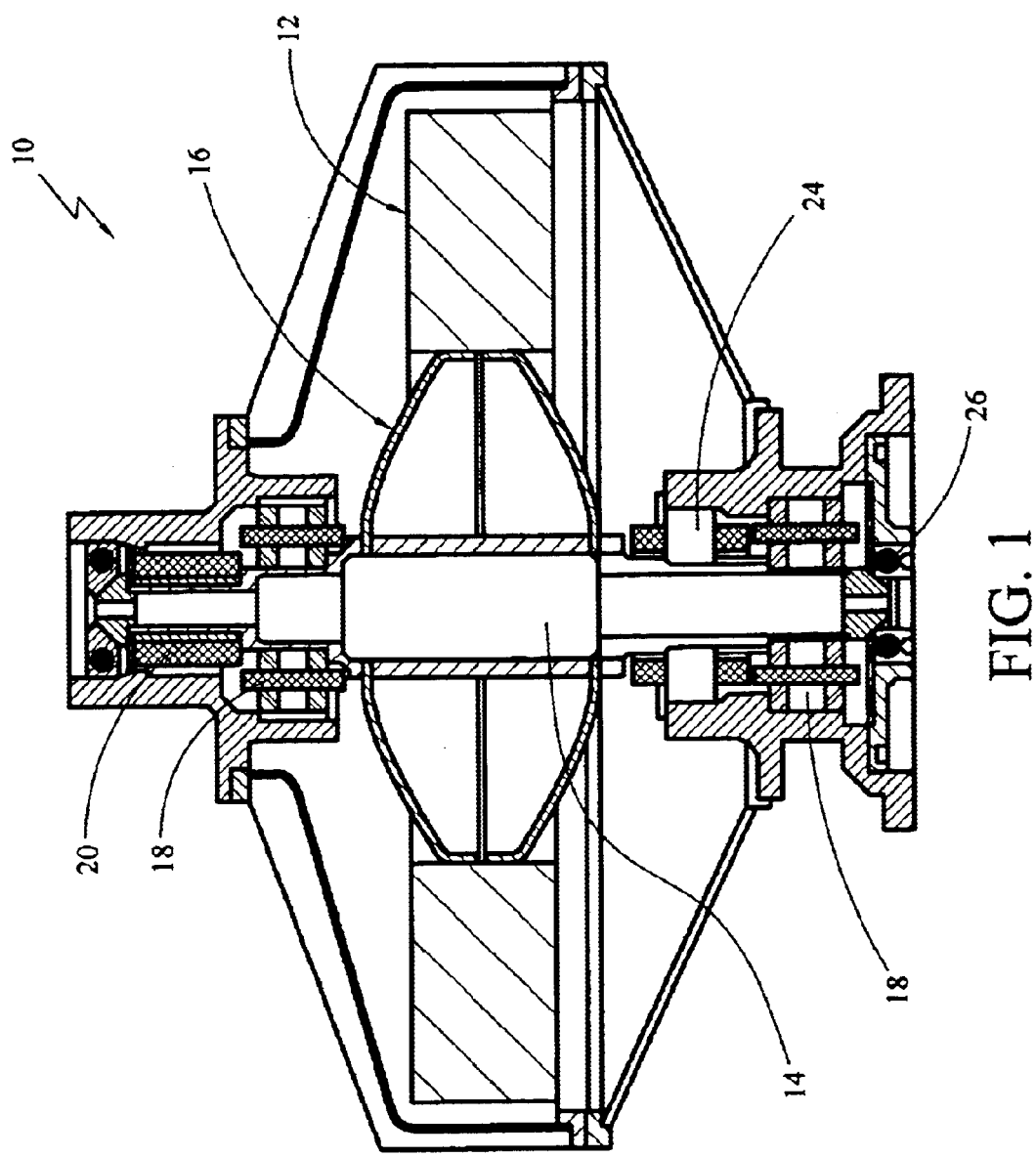
FIG. 1 is a cross-section side view of a prior art electromechanical battery.

With reference to the figures where like elements have been given like numerical designations to facilitate the reader's understanding of the present invention, and particularly with reference to the embodiment of the present invention illustrated in FIGS. 2 through 7, the various embodiments of the present invention are set forth below. As best shown in FIG. 2, the preferred embodiment of the electromechanical battery 30 of the present invention has an evacuated housing 32 enclosing a rotor structure 34 comprised of a composite rim (or similar) and magnetic levitation components, comprising conductive coils 36 and three rings 38, 40 and 42 of permanent magnet arrays, each consisting of a plurality of permanent magnets 44, on the fixed, centrally located core 46. As shown in the figures, the rotor structure has neither the shaft 14 or hub 16, from the prior art FIG. 1, that are utilized in the current state-of-the-art devices. Instead, rotor structure 34 is suspended by the magnetic force of the rings of magnet arrays 38, 40 and 42 reacting upon induced magnetic fields generated by the conductive coils 36 embedded within rotor 34.

Figure 6:
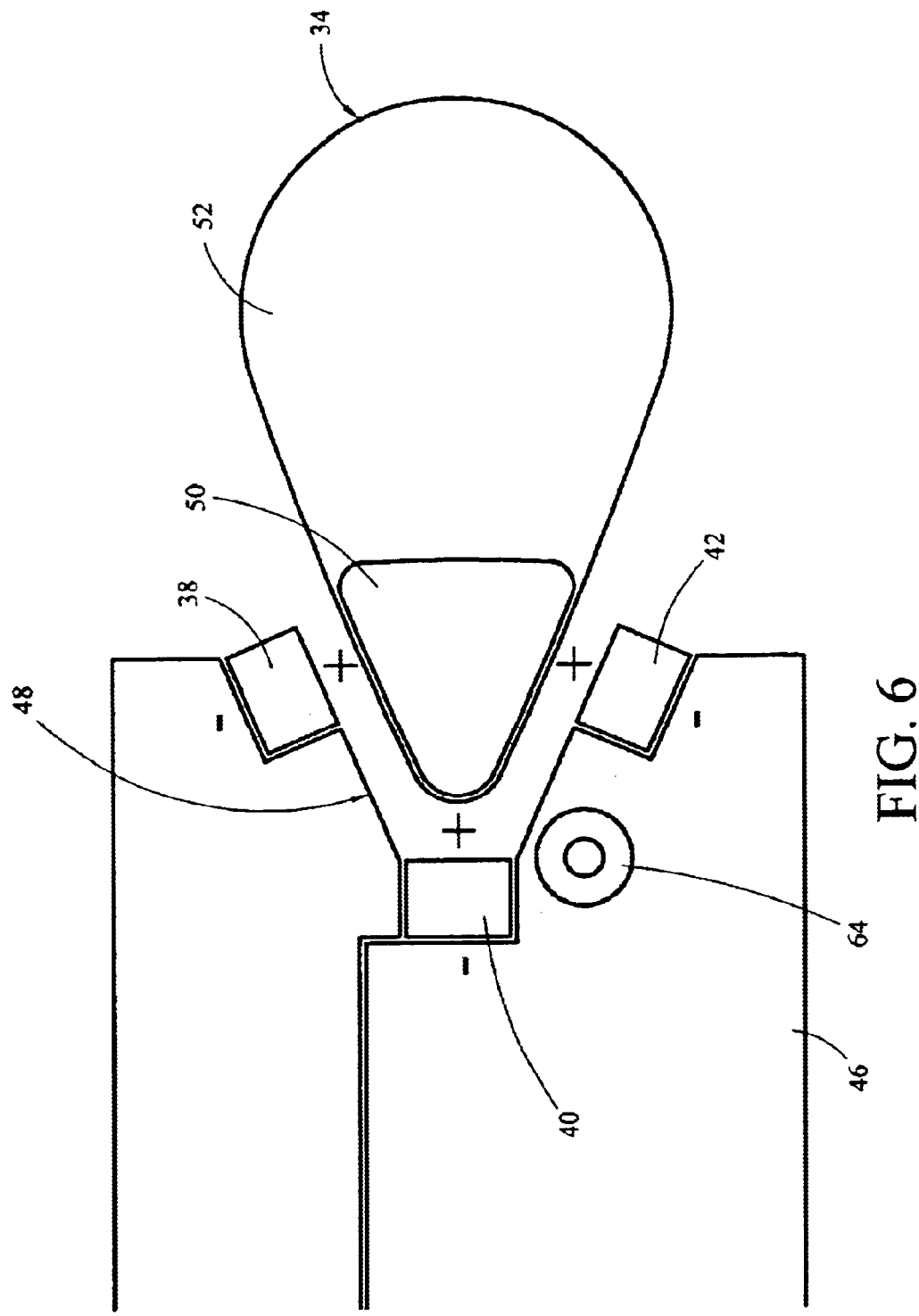
FIG. 6 is a partial cross-section of the electromechanical battery according to the present invention showing the rotor around the central core.

The housing 32 is sized and configured to fully and sealably enclose rotor structure 34 surrounding the fixed central core 46, including the magnetic levitation components described in more detail below. Preferably, housing 32 is manufactured out of lightweight but strong material, such as reinforced polymers, aluminum or like materials. Central core 46 is fixed to the inside of housing 32 and configured to include an internal raceway structure 48 used to mount the three rings 38, 40 and 42 of permanent magnet arrays so as to levitate rotor structure 34 during operation of battery 30. Central core 46 is manufactured out of a non-ferrous material, such as reinforced polymers and other similar materials, to avoid interfering with the magnetic fields created by the magnet arrays 38, 40 and 42 and spinning rotor structure 34. The core 46 can be solid or configured in a ring-like shape with the center portion hollow to reduce the weight of battery 30. As shown in FIGS. 2 and 6, the internal raceway structure 48 is shaped and configured to provide a magnetic field sufficient to levitate rotor structure 34. The outer surface of housing 32 can include various control and monitoring devices, such as battery storage and power usage indicators, to allow the operator of the battery 30 to monitor and control the battery 30.

The rotor structure 34 has two substructures, first 50 and second 52 composite cores, comprised primarily of carbon fiber filaments bound in an epoxy matrix. In the preferred embodiment, shown best in FIGS. 3 and 6, the conductive coils 36 of the magnetic levitation components are embedded within the inner perimeter of the rotor structure 34. The carbon fiber/epoxy first composite core 50 is formed by winding a continuous carbon filament in an axial manner into the cavity of a rotating mandrel. This mandrel is split through the midpoint of the cavity along a plane perpendicular to its axis of rotation, allowing for the removal of the finished core 50 after curing. This first core 50, with an inner diameter of approximately one half of the desired overall diameter of the finished rotor structure 34, is shown with a cross-section of roughly triangular shape, being somewhat distorted in a convex manner. However, the invention is not so limited. In fact, the cross-section of the conductive coils 36 mounted in the rotor structure 34 could range from the essentially triangular form shown to a shape that is circular, which has some advantages that may prove itself as a result of further research. Following the curing of first core 50 and its removal from the mandrel, a tightly-packed series of closed circuit, conductive coils 36 are wound about the triangular shape of the first core 50 in toroid fashion, completely encompassing it in a solid layer of coils 36. As an overlay to these coils 36, an elastomeric layer is added to create a resilient boundary between the magnetic levitation structure and the additional rotor components.

The coils 36 consist of a conductive material having high tensile strength, such as tungsten, aluminum, aluminum-clad titanium, or the like. The width of each coil 36 is less than the shortest distance between closest opposite poles along the permanent magnet arrays described below. This dimension allows each coil 36 to be isolated within a single section of the magnetic array. The coils 36 have insulated wire and the ends of each coil are electrically shorted to one another to form individual closed circuits. These coils form the rotor portion of the magnetically induced levitation system, which magnetically interacts with the permanent magnet arrays when the rotor 34 is in motion.

With the finished conductive coils 36 in place on the first core 50, the combined unit is inserted into a second winding mandrel, which is similar in general design to the first winding mandrel. The second winding mandrel also has a cavity split along a plane perpendicular to the axis of its rotation. The cavity is sized and shaped so as to position the first core 50, now with coils 36 and elastomeric coating thereon, firmly along the inner radius of the cavity. Unlike the cavity of the first mandrel, this second cavity is approximately teardrop in shape, having its greatest width in the region towards its outside diameter, beyond the position of first core 50. A second core 52 of carbon filament is wound in an axial manner into this cavity, thereby trapping the first core 50 (with coils 36) along its inner edge. This filament is allowed to cure into an integrated rotor unit 54 with first core 50 and coils 36. This results in the preferred configuration, wherein the conductive coils 36 are embedded in the rotor structure 34.

Figure 4C:
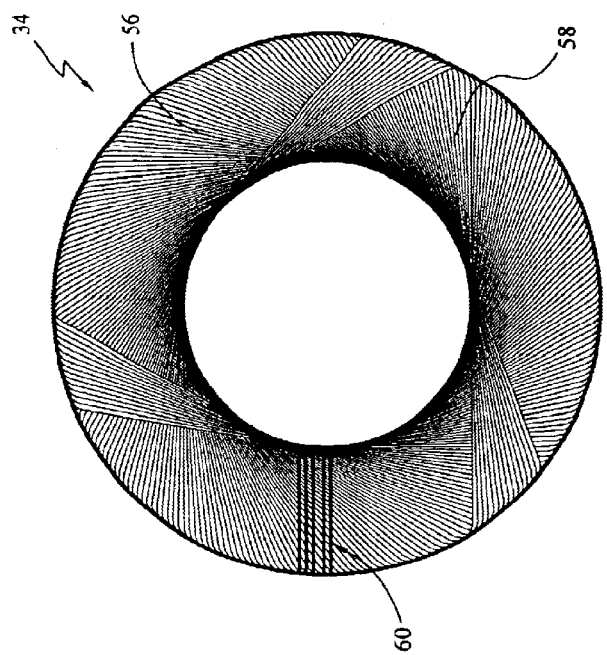
FIGS. 4a through 4c are illustrations of the continuous filament spiral-wound pattern that can be used to form the rotor for use with an electromechanical battery made according to the present invention.
Figure 4A:
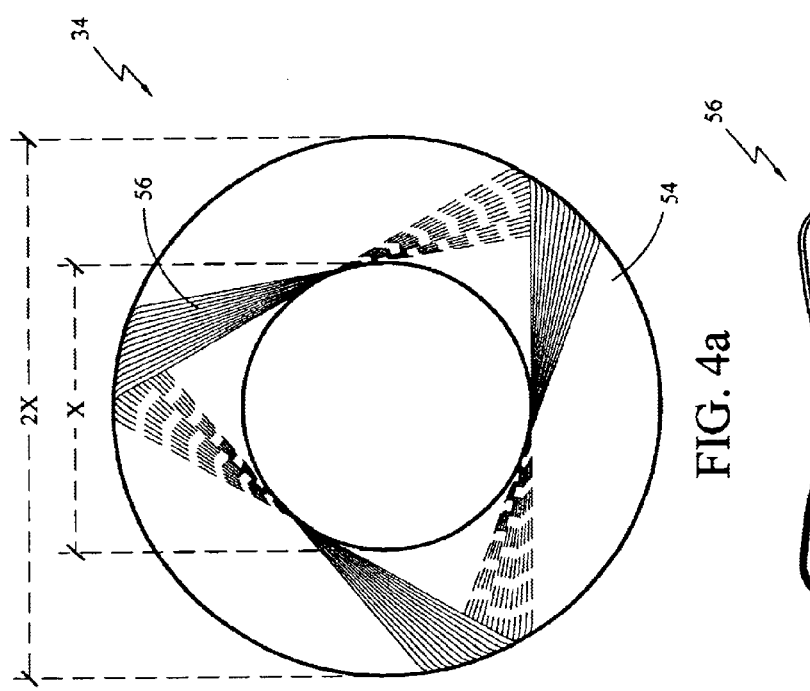
Figure 4B:

To complete the rotor structure 34 and configure it into a single unit, a first carbon filament layer 56 is wound over the surface of the integrated rotor unit 54, comprising second core 52 combined with first core 50 and coils 36, in an elongated toroid fashion. The surface-wrapped filaments 56 are applied to the rotor unit 54 in a continuous filament spiral-wound pattern. This filament path is shown in plan view FIG. 4a, the drawing showing approximately a dozen revolutions of the rotor in the winding process. In this figure, it can be seen that a ring OD to ID ratio of 2:1 allows the filament to follow a generally equilateral triangular path, where the filaments contact the rotor OD at approximately 120 degree intervals, as it winds through one revolution of the rotor unit 54. Each subsequent circuit of the rotor's circumference is applied adjacent to the formerly applied spiral filaments, forming multiple equilateral triangle forms (from a plan view perspective) until first carbon filament layer covers the entire surface of rotor unit 54. This unique path adds to the completed rotor's structural integrity, providing an overall reduction in susceptibility to rotor failure due to radial stresses. The course of a single filament as it traverses the surface of integrated rotor unit 54 is shown in cross-section along the filament's path in FIG. 4b. After the application of one complete layer of filaments (i.e., the first carbon filament layer 56) onto the surface of the rotor unit 54, a second carbon filament layer 58 is applied in a counter-rotating direction to the first layer 56, as shown in FIG. 4c. As with first layer 56, second carbon filament layer 58 is applied to the rotor unit 54, on top of first layer 56, in a continuous filament spiral-wound pattern in a generally equilateral triangular path. Combined, the two spiral layers 56 and 58 enhance radial and torsional strength of the rotor structure 34 and minimize radial expansion of the rotor 34 under centrifugal load.

To further enhance the radial and torsional strength of rotor 34 and minimize radial expansion, the preferred embodiment of the present invention 30 comprises a third carbon filament layer 60 applied over the first 56 and second 58 layers in sequential planes radial to the axis of rotor structure 34, as shown in FIG. 4c. Third layer 60 binds the outboard rotor elements (i.e., the second core 52) radially to the inboard rotor elements (i.e., first core 50 and coils 36), thereby further minimizing radial expansion of the rotor structure 34 as well as reducing the tendency for filament delamination, which is common in simple hoop-wound rotor designs. In the preferred embodiment, the embedded levitation components are integrated into the first 56, second 58 and third 60 filament layers, resulting in a single unified rotor structure 34.

In the preferred embodiment of the present invention 30, the primary structure of rotor 34 comprises the hoop-wound high-strength carbon filaments formed into the combined conductive levitation substructure and second core 52 having a cross-sectional area that is generally in the shape of a teardrop, with the levitation substructure forming the inner region of the teardrop. On top of this, the fiber layers 56, 58 and 60 form the secondary structure of rotor 34. The split winding mandrel, described above, achieves the finished teardrop shape. The teardrop shape serves to enhance rotor mass efficiency by placing approximately 60% of the rotor's mass in the outer 25% of the rotor OD. The placement of additional high-strength composite material outboard of the levitation substructure allows the rotor structure 34 to withstand the high centrifugal loads generated by the mass of the lower-strength levitation elements. In addition, the teardrop's large radius along the outer perimeter evenly distributes centrifugal loads into the subsequent spiral-wound surface reinforcements. From a fluid dynamics viewpoint, these loads are akin to those applied to the fabric of a hot air balloon as the lower density gas within the balloon is forced upward by the surrounding higher-density atmosphere and then contained by the strength of the fabric material which makes up the balloon. As set forth above, the secondary structural elements, first 56, second 58 and third 60 layers, comprises high-strength composite filaments similar to the hoop-wound material that are spiral-wound in multiple layers. To reduce cost, the composite filaments for the primary structural elements can be a lower strength material, due to the spiral-wound layers being placed over them.

Figure 5B:
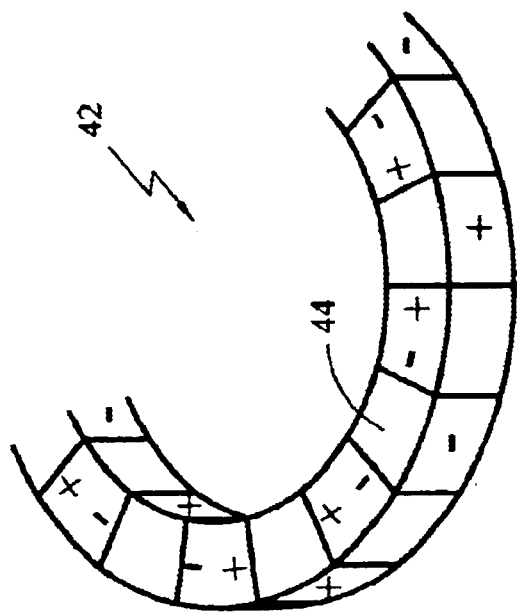
FIGS. 5a and 5b are illustrations of a preferred permanent magnet array (a Halbach Array) for the stationary magnetic levitation component for use with an electromechanical battery according to the present invention.
Figure 5A:
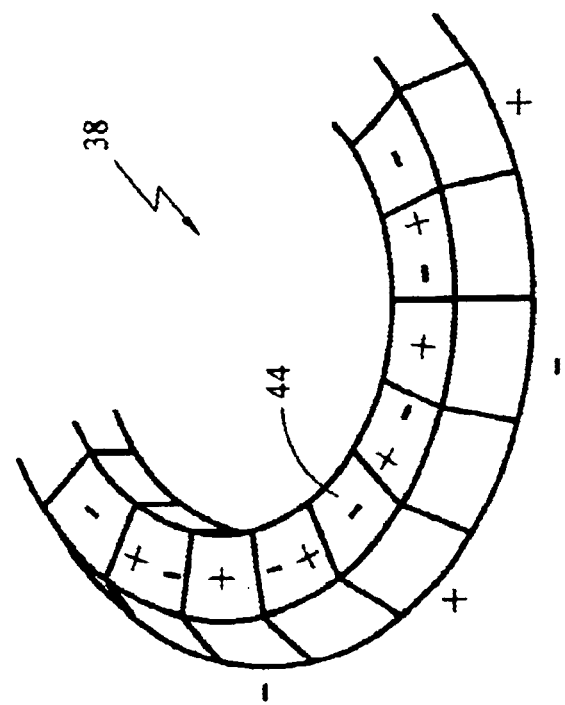

As discussed above, the preferred embodiment of the battery of the present invention 30 has levitation components comprising rotating portion embedded in the rotor and a stationary component fixed to the central core 46. The stationary component comprises three rings of permanent magnet arrays, a first ring 38 for the upper axial permanent magnet array, second ring 40 for the central radial permanent magnet array and third ring 42 for the lower axial permanent magnet array. FIG. 5a shows a partial ring of permanent magnets typical of first ring 38 and third ring 42 (reversed of first ring 38). Individual magnets 44 are shaped in such a manner as to adjoin one another and form a solid ring. In the preferred embodiment, the magnetic polarity of one set of magnets 44 is rotated 90 degrees in respect to adjoining magnets 44, and every-other magnet 44 is rotated 180 degrees, forming what is known as a Halbach Array. Such an alignment of poles in a series of magnets tends to concentrate nearly the entire magnetic field into a path along one side of the array, and cancel out the field on the opposite side of the array. FIG. 5b shows another partial ring and the magnetic polarity of its individual components, representative of second ring 40. In a schematic view, FIG. 5 shows a cross section of the central core 46 with magnet rings 38, 40 and 42 in their relative positions to the conductive coils 36 on first composite core 56. The magnetic fields of rings 38, 40 and 42 are aligned in their positions on the central core 46 such that common poles along all three rings form a radial pattern around the circumference of the central core 46, the fields thus reinforcing one another at the location of the coils 36 on the rotor structure 34. The vertical midpoint of the three concentric magnet rings 38, 40 and 42 falls on the rotor's axis of rotation. With the rotor 34 in motion and the coils 36 passing through the stationary magnetic fields generated by the three aligned rings 38, 40 and 42 forming Halbach Arrays, temporary magnetic fields are induced in the closed circuit of each coil 36. The polarity of these temporary fields mirrors the polarity of the Halbach Array at the position through which the coil 36 is passing. The resultant opposing force between the induced magnetic field in each coil 36 and the common field generated by the three permanent magnet rings 38, 40 and 42 repels the coils 36, and in turn the entire rotor structure 34, away from the Halbach Array rings 38, 40 and 42. The location of first 38 and third 42 rings react with the coils 36 to maintain axial stability, while second ring 40 maintains radial stability of the rotor 38 relative to the core 46 and housing 32. As these forces are elastic and self-centering, it creates a completely passive system that does not require the sensor or computational equipment needed to monitor and control levitation (or the power consumption required by this equipment), nor the electromagnets an active system would employ to maintain alignment of the rotor structure in the prior art (comprised rim 12, shaft 14 and hub 16 in FIG. 1).

Rare earth permanent magnets 44, such as neodymium iron boron, exhibit excellent magnetic properties for use in passive magnetic bearings, but are brittle and have a very low tolerance to excessive forces. By placing high-strength wire coils 36 into the rotor 34, the brittleness and low tolerance have no effect on top-end performance, as it does in designs incorporating the permanent magnets 44 into the rotor 34. Furthermore, by utilizing a single ring of coils 36 embedded within the rotor 34, not only does the intensity of the coils' magnetic fields increase with their exposure to three polarized permanent magnet fields, from rings 38, 40 and 42, but it creates a single, three-dimensionally stable magnetic bearing element, thereby reducing both cost and weight of the flywheel battery unit. As set forth above, for rotors 34 of increased mass and dynamic loads, the permanent magnet rings 38, 40 and 42 could be arranged into Halbach Arrays to further intensify the field strength applied to the coils 36.

Figure 2:
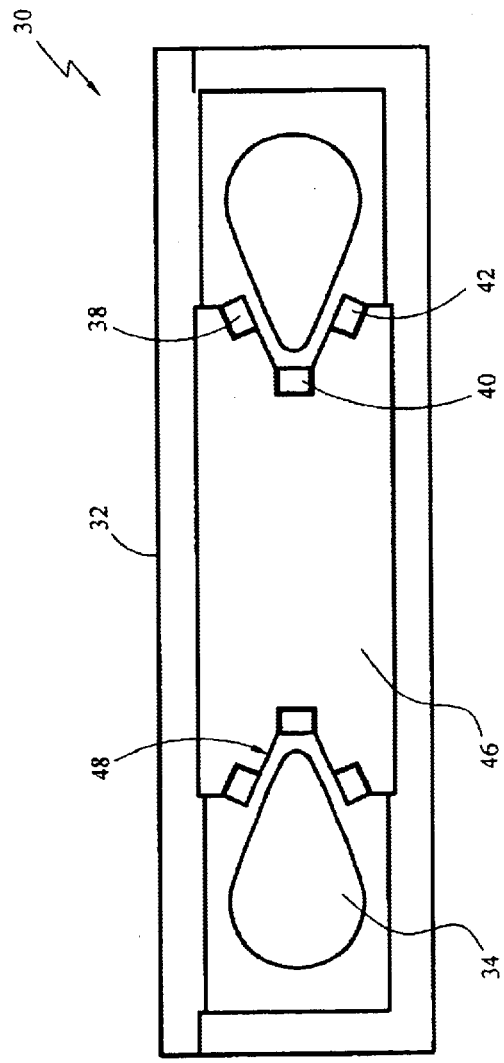
FIG. 2 is a cross-sectional side view of an electromechanical battery according to the present invention.
Figure 3:
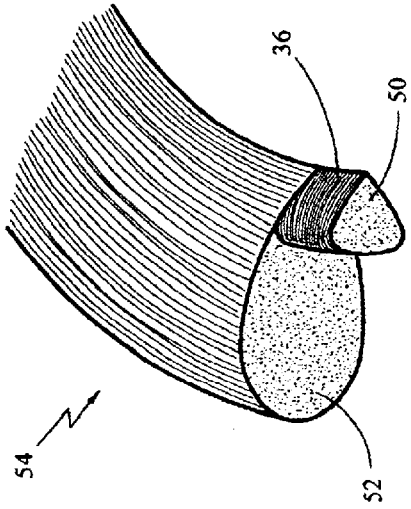
FIG. 3 is a cross-sectional view of an embodiment of the rotor having embedded conductive coils for use with an electromechanical battery according to the present invention.

Two further attributes of this unique configuration of levitation are also considered advantageous over current state of the art systems (as illustrated in FIG. 1). Most, if not all, prior art designs seen to date have relied on the use of a solid metallic hub 16 of one configuration or another, usually acting as a winding mandrel for a rim 12 of carbon fiber/epoxy during construction of the rotor, and providing a component of the levitation system during its operation. Most rotor designs also employ a ferrous shaft 14 attached to the hub 16 and spinning with the rotor. Conventional wisdom would seem to indicate that the added mass of these extra materials would increase the energy storage capacity of the rotor by significantly increasing the overall weight. However, two problems cancel out such anticipated benefits from these rotor designs. Doubling the weight of any given rotor design, with weight distribution and maximum working velocity remaining the same, only provides for energy storage capacity twice that of the original. By utilizing a stronger design or materials that allow a similarly massed rotor to spin at twice the original velocity, energy storage capacity is quadrupled, instead of only doubled. Because high rotational speeds are ideal for maximizing efficiency of a rotor design, adding an abundance of any material not possessing the strength to resist the loads of its own mass against the centrifugal forces imposed by such high rates of rotation is a step in the wrong direction. In designs incorporating such metallic hubs 16 and shafts 14, much of the tensile strength afforded by the carbon fiber rim 12 is used simply to maintain the structural integrity of the hubs 16.

One further characteristic of this dynamically induced levitation system worth noting is its unusual efficiency curve. More conventional electromagnetic levitation systems generate eddy currents that reduce the ratio of lift to drag as speed increases. In contrast, this induced method becomes more efficient as rotational velocities increase. This makes it ideal for long term storage of energy as magnetic frictional losses decrease the closer the rotor 34 gets to its maximum working speed, and thus its highest energy storage level.

Figure 7:
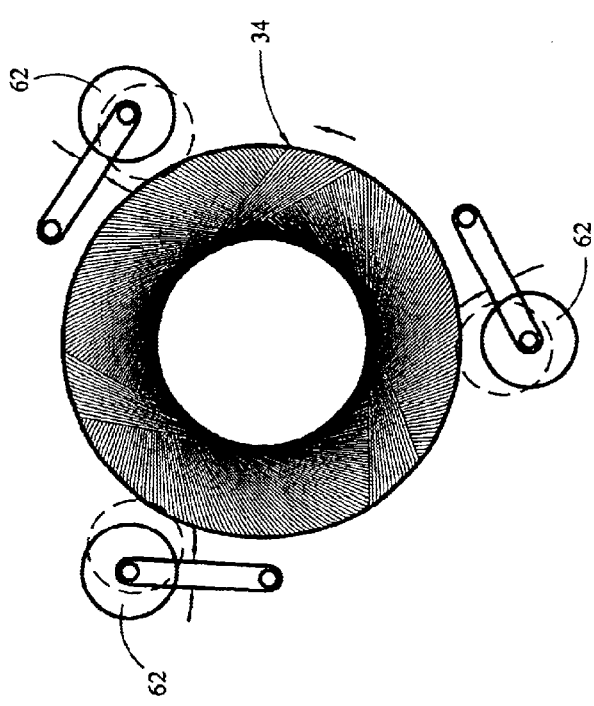
FIG. 7 is a plan view of a multi-wheel start-up system around a rotor for use in the electromechanical battery of the present invention.

As rotor levitation is dynamically induced and achieved at a relatively low rate of rotation, a fairly simple touchdown system for the rotor 34 could consist of three rollers 62 placed equal distances around the perimeter of the rotor 38, as shown in FIG. 7. These rollers 62 would be motorized in order to spin at rates capable of transferring the rotor 34 into, and out of, a dynamically levitated state. Rollers 62 would also move in such a manner as to engage themselves along the rotor's perimeter, and release it as needed. The rollers 62 would be tapered to a smaller diameter near their midpoint in order to capture the rotor 34 along the convex curve of its outer surface. When energy storage was not required of the unit, the rollers 62 would cease to rotate and remain in contact with the rotor 34 as a locking mechanism.

To complete the function of an electromechanical battery 30, a system for energy input and output must be included. Such systems are well known in the prior art. In the preferred embodiment, battery 10 would rely on a series of electro-magnets 64 located in the central core 46 adjacent to the Halbach Array rings 38, 40 and 42, capable of reacting with the temporary magnetic fields induced in the rotor coils 36 in such a manner as to impart additional momentum to the rotor 34 as a process of storing energy. The electromagnets 64 can act to decelerate the rotor as well in order to retrieve energy previously stored. In this way, the electromagnetic battery 30 acts alternately as either a motor or a generator, converting energy from electrical to kinetic form, and on demand back into an electrical form.

In use, utilizing an external means of support and locomotion, the rotor 34 is initially accelerated by auxiliary mechanical means, such as motorized rollers 62, above a transitional speed, at which the permanent magnets 44 in rings 38, 40 and 42 induce sufficient current flow in the rotor's coils 36 to generate magnetic fields within the coils 36 of sufficient strength to levitate rotor 34 within housing 32. Above this transitional speed, the levitation system is self-sustaining and fail safe, with lift to drag ratios increasing with elevated velocities, into the range of 200:1 or better at extreme speeds. The repulsive effect generated between the coils 36 and permanent magnets 44 is dynamically stable, and requires no active controls to monitor rotor 34 position or correct for misalignments. This greatly reduces battery unit costs and eliminates speed constraints imposed by any factor other than the overall structural integrity of the rotor unit 34.

An alternative embodiment of the electro-magnetic battery 30 is the use of carbon single-walled nanotubes in filament form in place of the carbon fibers. When commercially available, use of carbon nanotubes advances the rotor 34 design in two ways. First, structural integrity would be enhanced with the predicted ten-fold increase in carbon fiber tensile strength in comparison with current versions of carbon filaments. Second, and possibly of even greater benefit, would be the use of carbon nanotube filaments functioning as the levitation coils 36 on the rotor 34. Current experimental versions of carbon nanotubes seem to exhibit metallic electrical properties. If the conductivity of a commercial version were sufficient, the teardrop cross-section of rotor 34 could be achieved in a single mandrel winding process, with nanotube coils applied to the outer surface of the entire rotor 34, simplifying construction while lowering overall rotor mass.

Figure 8:
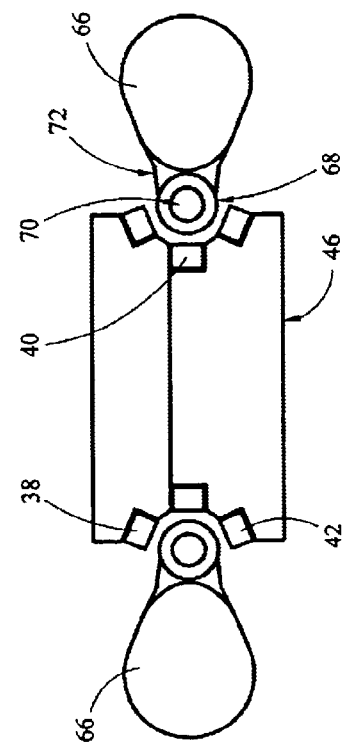
FIG. 8 is an embodiment of the electromechanical battery of the present invention showing the use of non-embedded conductive coils for the magnetic levitation system.

In another embodiment of the present invention, shown in FIG. 8, the conductive coils 36 are external (i.e., non-embedded) to the composite rotor structure 34. The composite rotor structure 34 is comprised singularly of carbon fiber filaments bound in an epoxy matrix, as opposed to having the conductive coils 36 of the magnetic levitation components embedded within the inner perimeter of the rotor structure 34. As with the preferred embodiment, the solid carbon fiber/epoxy composite core 66 is formed by winding a continuous carbon filament in an axial manner into the cavity of a rotating mandrel. A conductive coil element 68 comprises the conductive coils 36 wrapped around a composite levitation ring 70, similar to the first composite core 50 in the preferred embodiment, made from a carbon fiber/epoxy composite material. Conductive coil element 68 would connect to composite rotor structure 34 with a hub 72, such as a split titanium interface hub, that would spin conductive coil element 68 around central core 46. The first 56, second 58 and third 60 carbon filament layers could be wrapped around the solid composite rotor 34, as described above for the embedded embodiment. The benefit of this configuration is that it avoids any problems that may occur with different expansion coefficients for the different materials in the rotor structure 34 having the embedded conductive coils.

Figure 9:
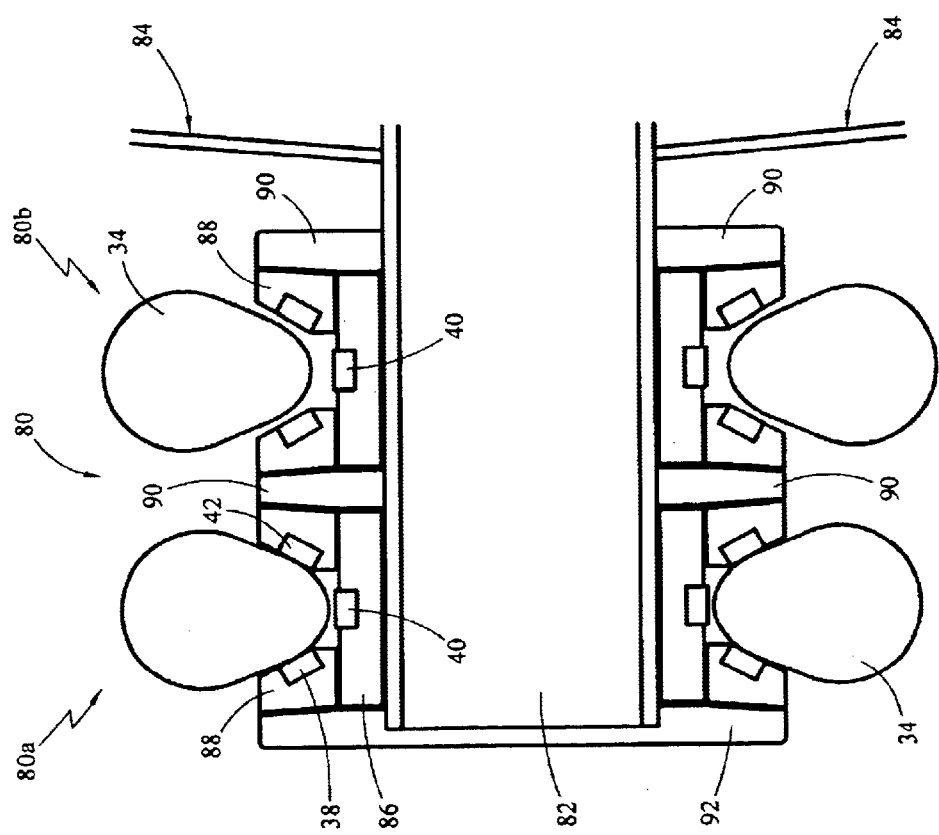
FIG. 9 is a cross-section of an alternative embodiment of the electromechanical battery of the present invention configured as a space-based battery.
Figure 10:
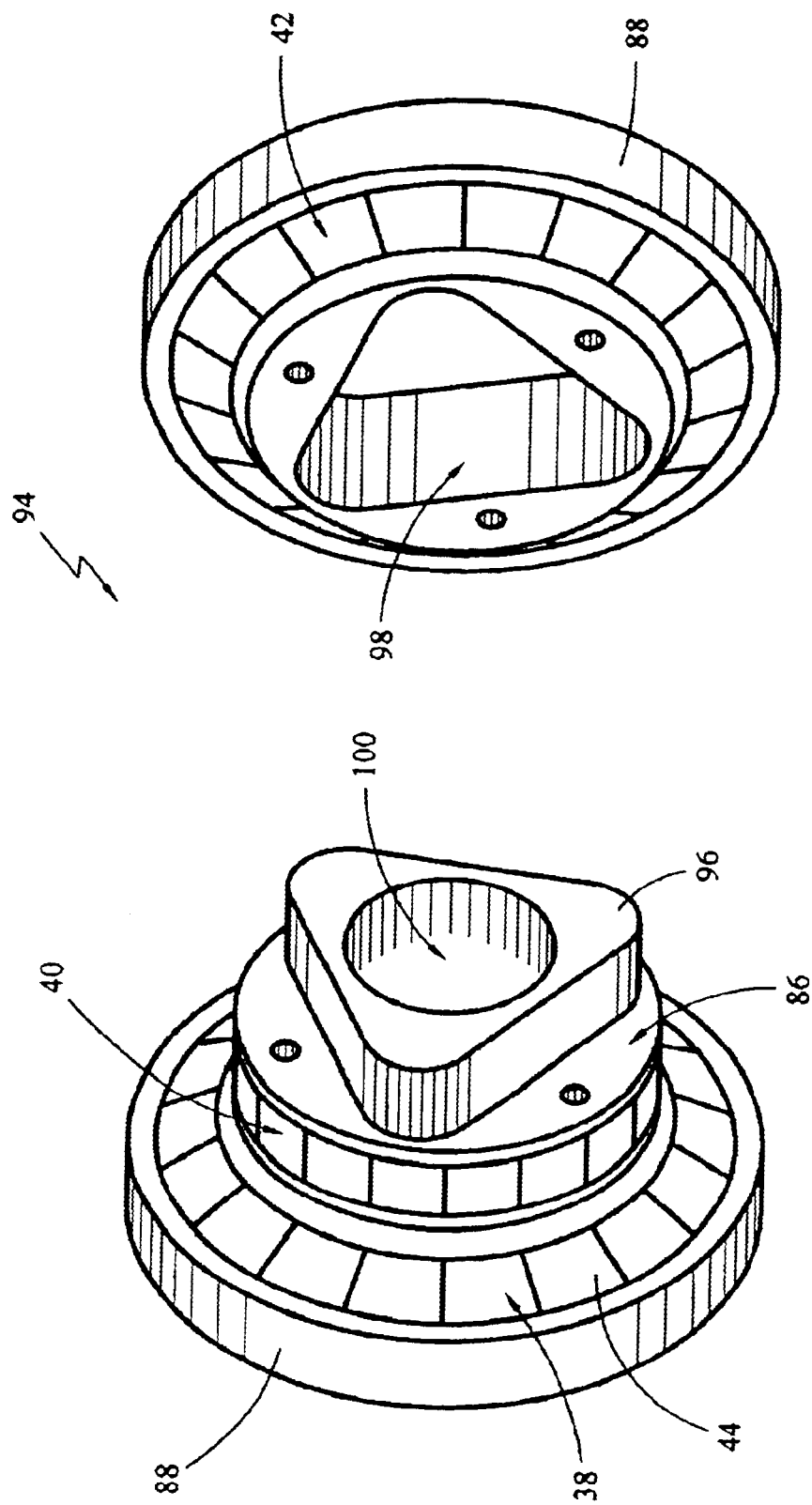
FIG. 10 is a perspective view of the permanent magnet core structure for the battery shown in FIG. 9.

In an alternative embodiment of the present invention, shown in FIGS. 9 and 10, housing 32 is eliminated from the electromechanical battery of the present invention, designated generally as 80. This embodiment of the present invention is particularly applicable for use in satellite or other space installations. The configuration of the battery 80 shown in FIG. 9 is two batteries 80a and 80b joined side-by-side and mounted to a hollow mast, boom or other mounting structure 82 extending externally from the satellite, space vehicle or space structure 84. The two batteries 80*a* and 80*b* rotate in opposite directions to balance the space structure 84 and allow for attitude control. Batteries 80*a* and 80*b* comprise a radial cylinder 86, axial disks 88, fixed disks 90 and 92, rotor 34, upper axial array 38, radial array 40 and lower axial array 42. Radial cylinder 86 and axial disk 88 are configured to rotate or spin around boom 82. Fixed disks 90 and 92 are securely attached to boom 82 and are configured to separate and enclose the sides of batteries 80*a* and 80*b*, as set forth below. Fixed disk 92 also functions as the boom cap. As shown in FIG. 10, the radial cylinder 86 and axial disks 88, comprising the permanent magnet core structure 94, can be made into three pieces that join together with the use of alignment base 96 that is sized and configured to fit into alignment opening 98. A central opening 100 through the radial cylinder 86 and axial disks 88 is sized and configured to accept boom 82. As explained below, axial disk 88 having lower axial array 42 thereon is configured to move in an axial direction relative to the axial disk 88 having upper axial array 38 thereon.

During launch and acceleration to transitional speed, the axial disks 88 are slid inward toward each other such that they are positioned against rotor 34 so as to clamp rotor 34 in place and hold it stationary, as shown in battery 80*a*. A pneumatic bearing and motor assembly (not shown) is located at the interface between the radial cylinder 86 and boom 82. After arriving in orbit, a pressurized gas is released along the interface of the magnet core structure 94 and boom 82 to activate the pneumatic bearing and motor assembly, causing it to rotate the combined magnetic core structure 94 and rotor 34 up to transition speed. Upon attaining transition speed, the axial disks 88 would spring open to release the rotor 34, as shown with battery 80*b*. The axial disks 88 would slide outward from each other until they contact the fixed disks 90 and/or 92, which would decelerate the magnet core structure 94 to its final stationary position on the boom 82. Although the above would be a one-time only use, it would likely keep the cost of the satellite integrated power and attitude control system to a minimum, as the external flywheel units (possibly six per satellite) of the present invention 80*a* and 80*b* would eliminate the need for the external housing that is necessary to carry the conventional shaft and bearing assemblies of current flywheel designs.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

What is claimed is:

1. An electro-mechanical battery, comprising:
    a housing;
    a central core fixedly disposed in said housing, said central core having an internal raceway structure thereon;
    a composite rotor enclosed in said housing around said central core, said composite rotor configured to spin about its vertical axis in said housing, said composite rotor having a plurality of closely spaced closed-circuit embedded conductive coils, said embedded conductive coils wrapped around a first composite core, said first composite core comprising carbon fiber filaments bound in an epoxy matrix; and
    one or more set of permanent magnet arrays on said internal raceway and disposed between said composite rotor and said central core.

2. The electro-mechanical battery of claim 1, wherein said composite rotor further comprises a second composite core outwardly located from said first composite core and a plurality of strands of composite filaments wrapped around said first composite core and said second composite core, said second composite core comprising carbon fiber filaments bound in an epoxy matrix.

3. The electro-mechanical battery of claim 2, wherein said plurality of strands of composite filaments comprises a first carbon filament layer and a second carbon filament layer, said first carbon filament layer wrapped around said first composite core and said second composite core in a first continuous filament spiral-wound pattern.

4. The electro-mechanical battery of claim 3, wherein said second carbon filament layer is wrapped around said first carbon filament layer in a second continuous filament spiral-wound pattern, said second continuous filament spiral-wound pattern applied in a counter-rotating direction to said first continuous filament spiral-wound pattern.

5. The electro-mechanical battery of claim 4, further comprising a third carbon filament layer wrapped around said second carbon filament layer, said third carbon filament layer wrapped around said second carbon filament layer in sequential planes radial to the vertical axis of said rotor.

6. The electro-mechanical battery of claim 3, wherein said second carbon filament layer is wrapped around said first carbon filament layer in a pattern comprised of sequential planes radial to the vertical axis of said rotor.

7. The electro-mechanical battery of claim 1, wherein said one or more sets of permanent magnet arrays comprises a first ring of magnets forming an upper axial magnet array, a second ring of magnets forming a central radial magnet array and a third ring of magnets forming a lower axial magnet array.

8. The electro-mechanical battery of claim 7, wherein each of said sets of permanent magnet arrays is configured into a Halbach Array.

9. The electro-mechanical battery of claim 1, wherein each of said sets of permanent magnet arrays is configured into a Halbach Array.

10. The electro-mechanical battery of claim 1, wherein said composite rotor has a substantially teardrop-shaped cross-section.

11. The electro-mechanical battery of claim 1, wherein said composite rotor has an outside diameter to inside diameter ratio of approximately 2 to 1.

12. The electro-mechanical battery of claim 1 further comprising a conductive coil disposed between said composite rotor and said one or more sets of permanent magnet arrays.

13. The electro-mechanical battery of claim 12 further comprising an interface hub interconnecting said conductive coil to said composite rotor.

14. The electro-mechanical battery of claim 1, wherein said housing is evacuated prior to use of said electro-mechanical battery.

15. An electro-mechanical battery, comprising:
    a mounting structure;
    a central core disposed on said mounting structure, said core having an internal raceway structure thereon;
    a composite rotor disposed around said central core, said rotor configured to spin about its vertical axis around said central core, said composite rotor having a plurality of closely spaced closed-circuit embedded conductive coils, said embedded conductive coils wrapped around a first composite core, said first composite core comprising carbon fiber filaments bound in an epoxy matrix; and one or more set of permanent magnet arrays on said internal raceway and disposed between said composite rotor and said central core.

16. The electro-mechanical battery of claim 15, wherein said composite rotor further comprises a second composite core outwardly located from said first composite core and a plurality of strands of composite filaments wrapped around said first composite core and said second composite core, said second composite core comprising carbon fiber filaments bound in an epoxy matrix.

17. The electro-mechanical battery of claim 16, wherein said plurality of strands of composite filaments comprises a first carbon filament layer and a second carbon filament layer, said first carbon filament layer wrapped around said first composite core and said second composite core in a first continuous filament spiral-wound pattern.

18. The electro-mechanical battery of claim 17, wherein said second carbon filament layer is wrapped around said first carbon filament layer in a second continuous filament spiral-wound pattern, said second continuous filament spiral-wound pattern applied in a counter-rotating direction to said first continuous filament spiral-wound pattern.

19. The electro-mechanical battery of claim 18 further comprising a third carbon filament layer wrapped around said second carbon filament layer, said third carbon filament layer wrapped around said second carbon filament layer in sequential planes radial to the vertical axis of said rotor.

20. The electro-mechanical battery of claim 15, wherein said one or more sets of permanent magnet arrays comprises a first ring of magnets forming an upper axial magnet array, a second ring of magnets forming a central radial magnet array and a third ring of magnets forming a lower axial magnet array.

21. The electro-mechanical battery of claim 20, wherein each of said sets of permanent magnet arrays is configured into a Halbach Array.

22. The electro-mechanical battery of claim 15, wherein said composite rotor has a substantially teardrop-shaped cross-section.

23. The electro-mechanical battery of claim 15, wherein said rotor has an outside diameter to inside diameter ratio of approximately 2 to 1.

24. An electro-mechanical battery, comprising:

a housing;

a central core fixedly disposed in said housing, said central core having an internal raceway structure thereon;

a composite rotor enclosed in said housing around said central core, said composite rotor configured to spin about its vertical axis in said housing, said composite rotor having a first composite core and a second composite core, each of said first composite core and said second composite core comprising carbon fiber filaments bound in an epoxy matrix, said second composite core outwardly located from said first composite core;

a plurality of closely spaced closed-circuit embedded conductive coils wrapped around said first composite core;

a plurality of strands of composite filaments wrapped around said first composite core and said second composite core, said plurality of strands of composite filaments comprising a first carbon filament layer and a second carbon filament layer, said first carbon filament layer wrapped around said first composite core and said second composite core in a first continuous filament spiral-wound pattern, said second carbon filament layer is wrapped around said first carbon filament layer in a pattern comprised of sequential planes radial to the vertical axis of said rotor; and one or more set of permanent magnet arrays on said internal raceway and disposed between said composite rotor and said central core.

25. The electro-mechanical battery of claim 24, wherein said one or more sets of permanent magnet arrays comprises a first ring of magnets forming an upper axial magnet array, a second ring of magnets forming a central radial magnet array and a third ring of magnets forming a lower axial magnet array.

26. The electro-mechanical battery of claim 25, wherein each of said sets of permanent magnet arrays is configured into a Halbach Array.

27. The electro-mechanical battery of claim 24, wherein each of said sets of permanent magnet arrays is configured into a Halbach Array.

28. The electro-mechanical battery of claim 24, wherein said composite rotor has a substantially teardrop-shaped cross-section.

29. The electro-mechanical battery of claim 24, wherein said rotor has an outside diameter to inside diameter ratio of approximately 2 to 1.

30. The electro-mechanical battery of claim 24 further comprising a conductive coil disposed between said composite rotor and said one or more sets of permanent magnet arrays.

31. The electro-mechanical battery of claim 30 further comprising an interface hub interconnecting said conductive coil to said composite rotor.

32. The electro-mechanical battery of claim 24, wherein said housing is evacuated prior to use of said electro-mechanical battery.

33. An electro-mechanical battery, comprising:

a housing;

a central core fixedly disposed in said housing, said central core having an internal raceway structure thereon;

a composite rotor enclosed in said housing around said central core, said composite rotor configured to spin about its vertical axis in said housing, said composite rotor configured in a substantially teardrop-shaped cross-section, said composite rotor having a first composite core and a second composite core, said second composite core outwardly located from said first composite core, said second composite core comprising carbon fiber filaments bound in an epoxy matrix;

a plurality of strands of composite filaments wrapped around said first composite core and said second composite core, said plurality of strands of composite filaments having a first carbon filament layer and a second carbon filament layer, said first carbon filament layer wrapped around said first composite core and said second composite core in a first continuous filament spiral-wound pattern; and one or more set of permanent magnet arrays on said internal raceway and disposed between said composite rotor and said central core.

34. The electro-mechanical battery of claim 33, wherein said second carbon filament layer is wrapped around said first carbon filament layer in a second continuous filament spiral-wound pattern, said second continuous filament spiral-wound pattern applied in a counter-rotating direction to said first continuous filament spiral-wound pattern.

35. The electro-mechanical battery of claim 34 further comprising a third carbon filament layer wrapped around said second carbon filament layer, said third carbon filament layer wrapped around said second carbon filament layer in sequential planes radial to the vertical axis of said rotor.

36. The electro-mechanical battery of claim 33, wherein said one or more sets of permanent magnet arrays comprises a first ring of magnets forming an upper axial magnet array, a second ring of magnets forming a central radial magnet array and a third ring of magnets forming a lower axial magnet array.

37. The electro-mechanical battery of claim 36, wherein each of said sets of permanent magnet arrays is configured into a Halbach Array.

38. The electro-mechanical battery of claim 33, wherein each of said sets of permanent magnet arrays is configured into a Halbach Array.

39. The electro-mechanical battery of claim 33, wherein said rotor has an outside diameter to inside diameter ratio of approximately 2 to 1.

40. The electro-mechanical battery of claim 33, further comprising a conductive coil disposed between said composite rotor and said one or more sets of permanent magnet arrays.

41. The electro-mechanical battery of claim 40 further comprising an interface hub interconnecting said conductive coil to said composite rotor.

42. The electro-mechanical battery of claim 33, wherein said housing is evacuated prior to use of said electro-mechanical battery.

43. An electro-mechanical battery, comprising:
    a housing;
    a central core fixedly disposed in said housing, said central core having an internal raceway structure thereon;
    a composite rotor enclosed in said housing around said central core, said composite rotor configured to spin about its vertical axis in said housing, said composite rotor configured in a substantially teardrop-shaped cross-section, said composite rotor having a first composite core and a second composite core, said second composite core outwardly located from said first composite core, said second composite core comprising carbon fiber filaments bound in an epoxy matrix;
    a plurality of strands of composite filaments wrapped around said first composite core and said second composite core, said plurality of strands of composite filaments having a first carbon filament layer and a second carbon filament layer, said first carbon filament layer wrapped around said first composite core and said second composite core in a first continuous filament spiral-wound pattern, said second carbon filament layer wrapped around said first carbon filament layer in a pattern comprised of sequential planes radial to the vertical axis of said rotor; and
    one or more set of permanent magnet arrays on said internal raceway and disposed between said composite rotor and said central core.

44. The electro-mechanical battery of claim 43, wherein said one or more sets of permanent magnet arrays comprises a first ring of magnets forming an upper axial magnet array, a second ring of magnets forming a central radial magnet array and a third ring of magnets forming a lower axial magnet array.

45. The electro-mechanical battery of claim 44, wherein each of said sets of permanent magnet arrays is configured into a Halbach Array.

46. The electro-mechanical battery of claim 43, wherein each of said sets of permanent magnet arrays is configured into a Halbach Array.

47. The electro-mechanical battery of claim 43, wherein said rotor has an outside diameter to inside diameter ratio of approximately 2 to 1.

48. The electro-mechanical battery of claim 43 further comprising a conductive coil disposed between said composite rotor and said one or more sets of permanent magnet arrays.

49. The electro-mechanical battery of claim 48 further comprising an interface hub interconnecting said conductive coil to said composite rotor.

50. The electro-mechanical battery of claim 43, wherein said housing is evacuated prior to use of said electro-mechanical battery.

* * * * *